(12) United States Patent
Johnson, Jr.

(10) Patent No.: US 6,902,404 B2
(45) Date of Patent: Jun. 7, 2005

(54) VISUAL AID USING CONTACT LENSES

(76) Inventor: Leon A. Johnson, Jr., 14561 Macbeth Dr., Silver Spring, MD (US) 20906

(*) Notice: Subject to any disclaimer, the term of this patent is extended or adjusted under 35 U.S.C. 154(b) by 0 days.

(21) Appl. No.: 10/777,170

(22) Filed: Feb. 13, 2004

(65) Prior Publication Data

US 2004/0191740 A1 Sep. 30, 2004

Related U.S. Application Data

(60) Provisional application No. 60/457,922, filed on Mar. 28, 2003.

(51) Int. Cl.[7] ............................ G09B 23/22; A63H 3/38
(52) U.S. Cl. ...................... 434/271; 446/389; 446/296; 446/392; 446/342
(58) Field of Search ................................ 446/389, 296, 446/392, 342; 428/16, 542.4; 434/271, 296

(56) References Cited

U.S. PATENT DOCUMENTS

| 1,042,815 | A | * | 10/1912 | Myers |  |
|---|---|---|---|---|---|
| 1,061,002 | A | * | 5/1913 | Nutt |  |
| 1,535,163 | A | * | 4/1925 | Kintner | 434/271 |
| 3,125,826 | A | * | 3/1964 | Ostrander | 446/301 |
| 5,037,344 | A | * | 8/1991 | Secrist | 446/392 |
| 5,679,050 | A | * | 10/1997 | LLorens | 446/341 |
| 5,893,719 | A | * | 4/1999 | Radow | 434/271 |
| 6,123,595 | A | * | 9/2000 | Dean | 446/100 |
| 6,705,918 | B1 | * | 3/2004 | Chang | 446/392 |
| 2004/0077279 | A1 | * | 4/2004 | Lam et al. |  |

* cited by examiner

Primary Examiner—Jessica Harrison
Assistant Examiner—Dmitry Suhol
(74) Attorney, Agent, or Firm—Richard C. Litman

(57) ABSTRACT

A visual aid for using contact lenses comprises an eyeball and a cover that contains the eyeball, and a model contact lens. The eyeball includes a sclera, an iris and a pupil. The cover includes an upper eyelid and a lower eyelid that can be opened and closed. The visual aid also includes a simulated contact lens that can be placed between the eyelids and the eyeball for demonstrating the proper insertion and wearing of contact lenses. The eyelids simulate natural movements of human eyelids. Additionally, methods for using the visual aid for using contact lenses for instruction in insertion, and removal, of contact lenses from the eye are described.

11 Claims, 5 Drawing Sheets

VISUAL AID USING CONTACT LENSES

CROSS-REFERENCE TO RELATED APPLICATION

This application claims the benefit of U.S. Provisional Patent Application Ser. No. 60/457,922, filed Mar. 28, 2003.

BACKGROUND OF THE INVENTION

1. Field of the Invention

The present invention relates generally to ophthalmologic models, and more specifically to a visual aid for using contact lenses that can be used to demonstrate proper techniques for insertion and wearing of contact lenses, and methods for using the visual aid.

2. Description of Related Art

Ophthalmologic models are well known. Models of the eye and its associated parts have been used for many decades. Such models have been used to demonstrate the complex anatomy, of the eye as well as to simulate the appearance of various eye diseases. Contact lenses that are worn on the eye have been in widespread use for several decades. However, there is no ophthalmologic model to teach the new contact lens wearer how to properly insert and wear the contact lenses. Typically, the new contact lens wearer is talked through the insertion process, by an eye care professional, but the wearer must use his own eyes. This is awkward at best, and may be traumatic. Sometimes the new contact lens wearer is able to observe another contact lens wearer perform the process. The observation of the process is educational, but not sufficiently hands-on to instill confidence in the new contact lens wearer. It would be beneficial to have a three-dimensional model of the eye that the first-time contact lens wearer can manipulate to simulate the insertion of the new contact lenses, along with a series of written instructions to be used in conjunction with the three-dimensional eye model.

U.S. Pat. No. 1,042,815, issued to Jesse J. Myers on Oct. 29, 1912, describes a model of the human eye. However, the device is a two-dimensional model and is designed to demonstrate the complexities of the inner eye.

U.S. Pat. No. 1,061,002, issued to Buell Nutt on May 6, 1913, describes a device for advertising spectacle lenses and the like. While the device does show a particular style of lens being applied to the model eye, the 'entire eye model is two-dimensional and incapable of being held in the palm of a hand.

None of the above inventions and patents, taken either singly or in combination, is seen to describe the instant invention as claimed.

SUMMARY OF THE INVENTION

The invention is an ophthalmologic model. More specifically, the invention is a visual aid for using contact lenses that can be used to demonstrate proper techniques for insertion and wearing of contact lenses.

The contact lens training aid is substantially spherical and includes an eyeball contained within a close-fitting outer cover, and a model contact lens. The eyeball is enlarged, but realistic, and includes a sclera, iris and pupil. The cover includes a pair of eyelids. The eyelids may be manipulated and are moveable to simulate the look and feel of human eyelids. The eyelids fit closely to the eyeball and provide the contact lens wearer with realistic sensations for the correct method of inserting contact lenses into the wearer's own eyes.

Accordingly, it is a principal object of the invention to provide a visual aid for using contact lenses.

Another object of the invention is to provide a visual aid for using contact lenses that has moveable eyelids that can be opened and closed to demonstrate proper techniques for using contact lenses.

Yet another object of the invention is to teach a system for inserting and wearing contact lenses that is helpful to the new contact lens wearer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
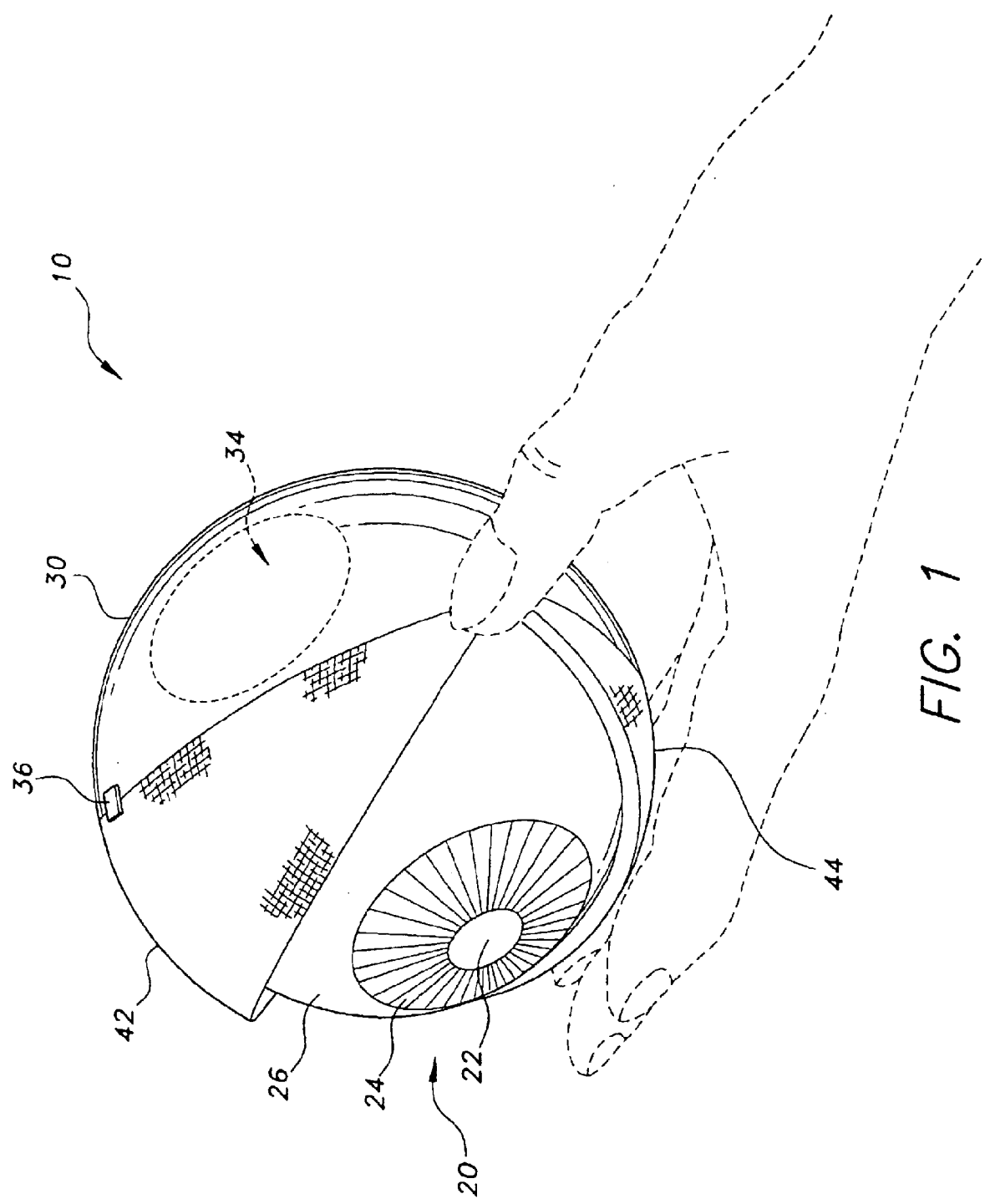
FIG. 1 is an environmental, front perspective view of a visual aid for using contact lenses according to the present invention.

The present invention is a visual aid for using contact lenses, generally designated as 10 in the drawings. As shown in FIG. 1, the visual aid for using contact lenses 10 is basically an enlarged model of the human eye having an outer cover 30, a model eyeball 20 moveably contained within the outer cover 30, and upper and lower eyelids 42, 44 that can be opened and closed.

The model eyeball 20 is generally spherical, having a shape similar to the human eye. Anatomical features of the human eye are visible on the surface of the model eyeball 20, and include a pupil 22, an iris 24, and a sclera 26.

Figure 2:
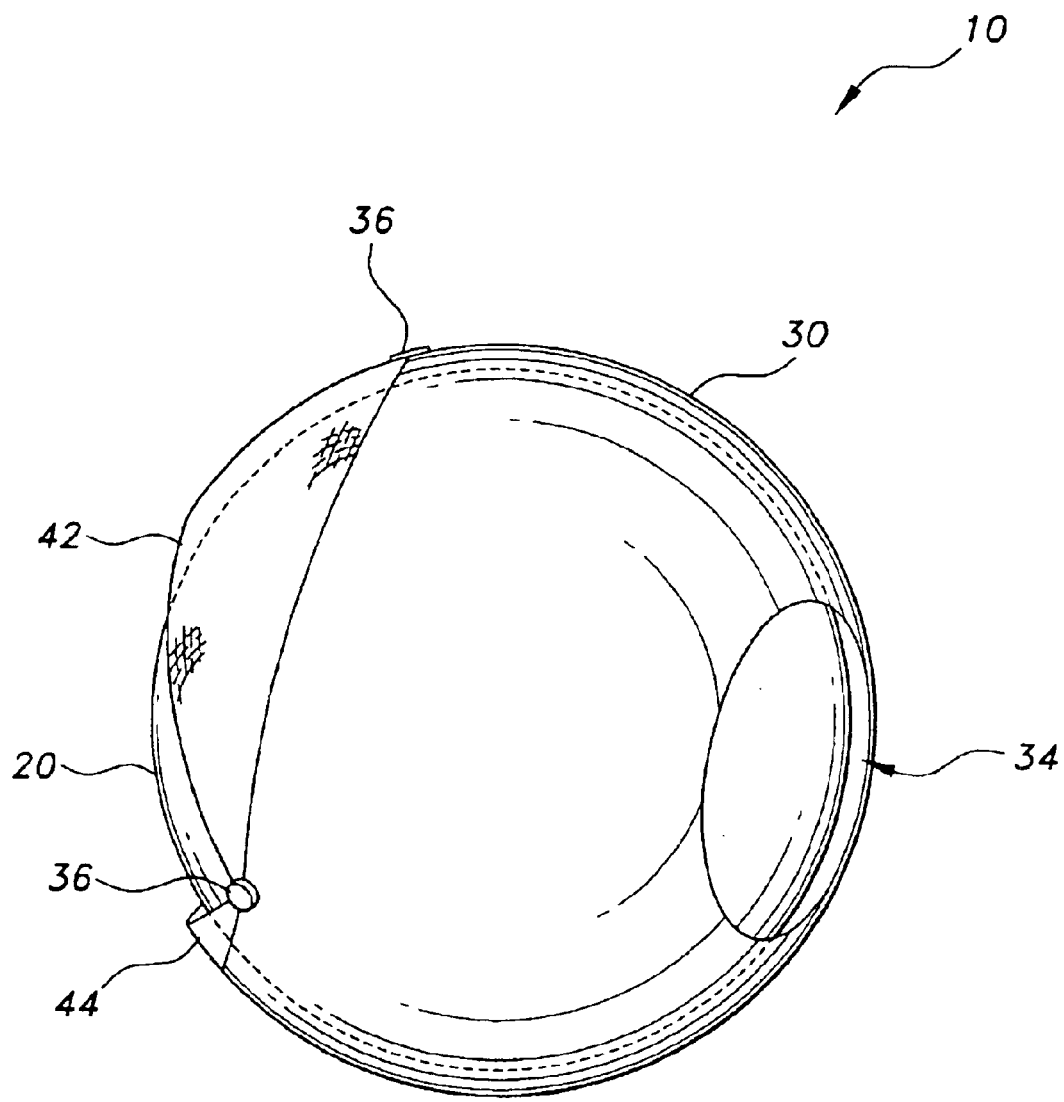
FIG. 2 is a back perspective view of a visual aid for using contact lenses according to the present invention.

The outer cover 30 contains the model eyeball 20, and has a front opening that exposes the eyeball 20. In use, the model eyeball 20 is generally oriented within the outer cover 30 so that the pupil 22 and iris 24 and a portion of the sclera 26 are visible through the front opening. The outer cover 30 has a rear opening 34, seen best in FIG. 2, to permit manipulation of the model eyeball 20, so that the iris 22 and pupil 24 of the eyeball 20 may be repositioned relative to the front opening.

Figure 3:
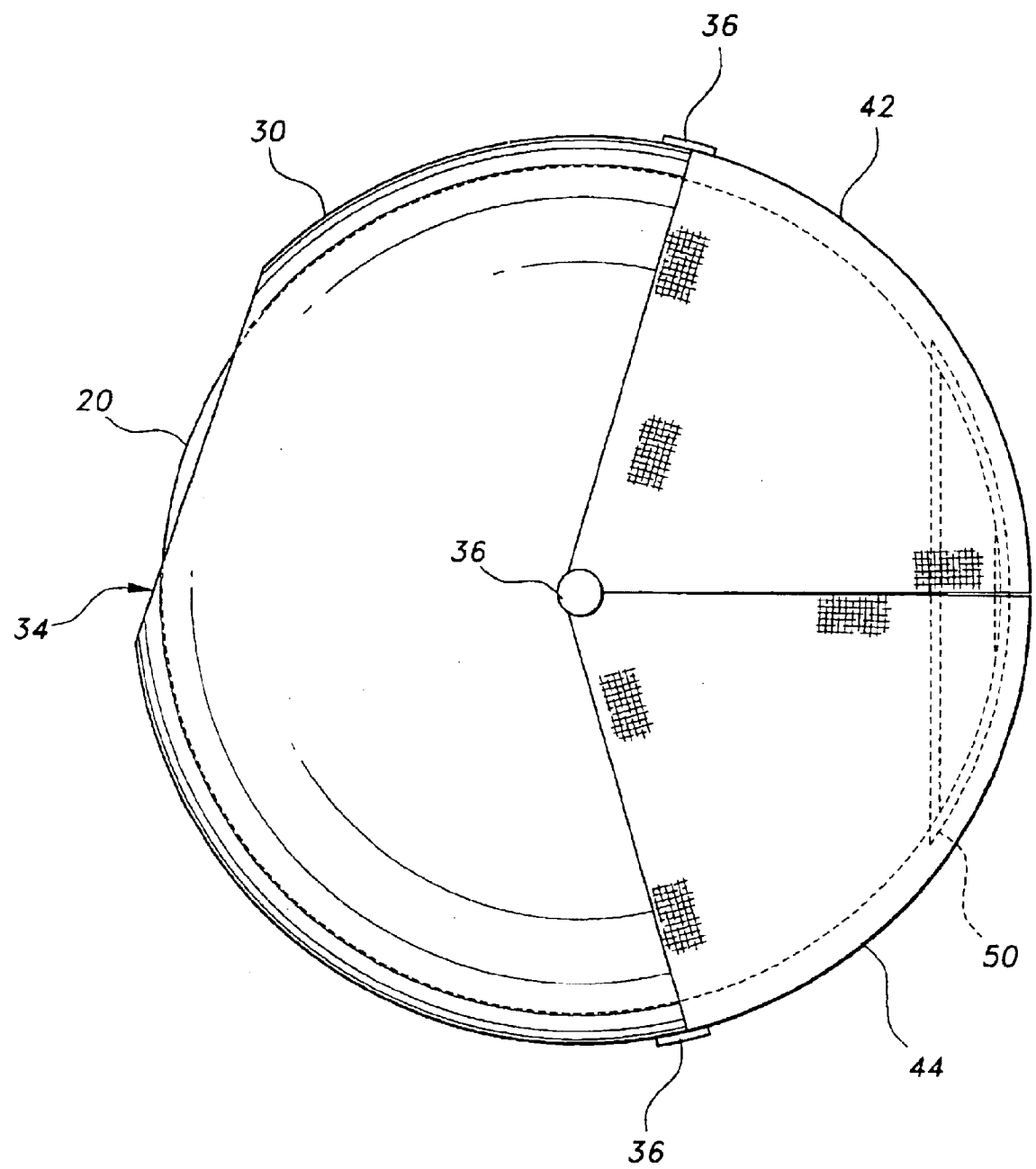
FIG. 3 is a side view of a visual aid for using contact lenses according to the present invention, with the eyelids closed over a model contact lens.
Figure 4:
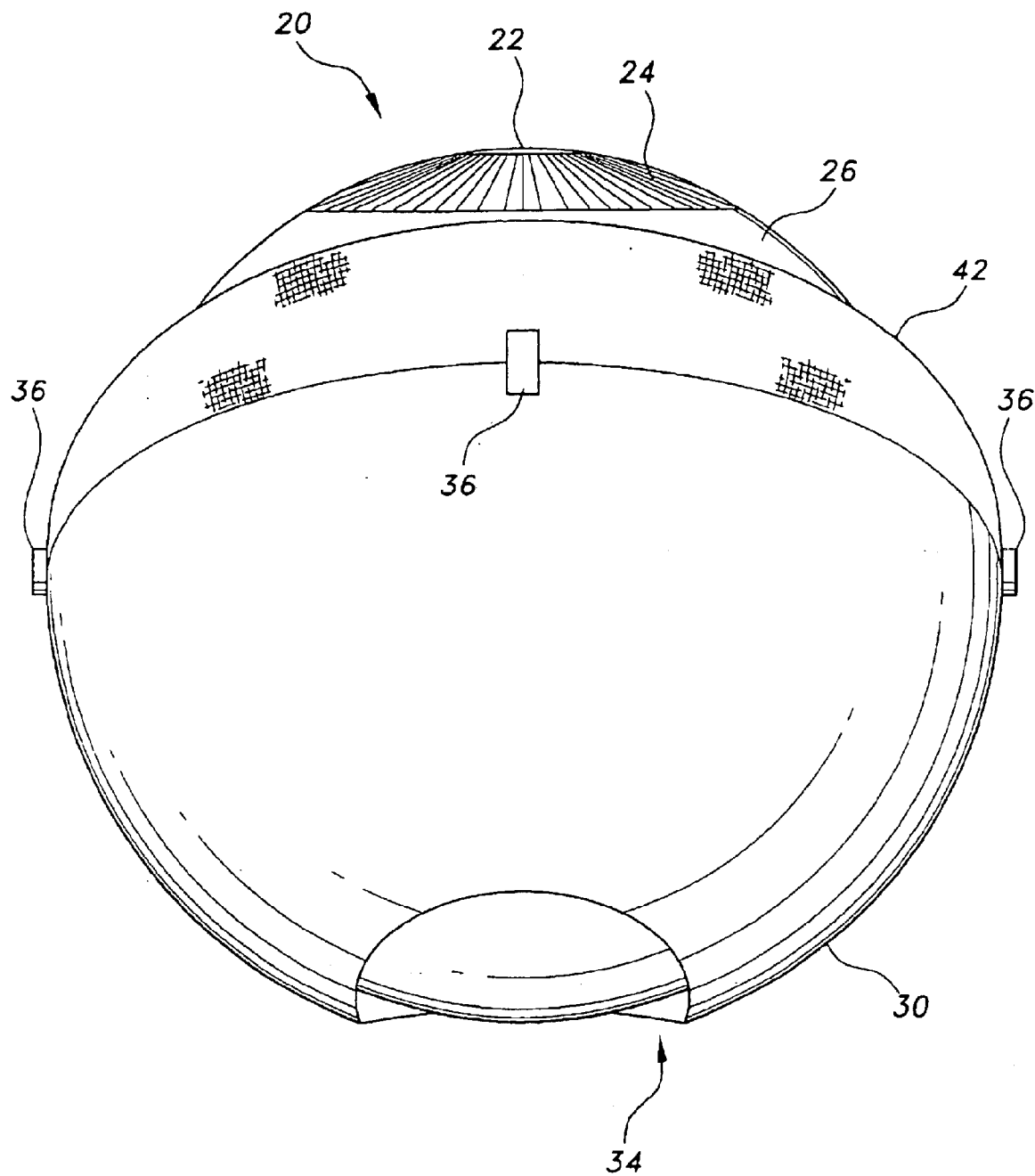
FIG. 4 is a top view of a visual aid for using contact lenses according to the present invention, with the eyelids opened.

The eyelids 42, 44 are made from a soft and pliable material such as cloth, a rubberized sheet material, a flexible plastic, or the like. The eyelids 42, 44 are fastened to the outer cover 30 with a plurality of clips 36 disposed on the outer cover 30. The upper edge of the upper eyelid 42 is fastened above the front opening of the outer cover 30, while the lower edge of the upper eyelid 42 is left unfastened. Likewise, the lower edge of the lower eyelid 44 is fastened below the front opening of the outer cover 30, while the upper edge of the lower eyelid 44 is left unfastened. Pulling the lower edge of the upper eyelid 42 upward while pulling the upper edge of the lower eyelid 44 downward opens the eyelids 42, 44 to expose the model eyeball 20. Similarly, pulling the lower edge of the upper eyelid 42 downward while pulling the upper edge of the lower eyelid 44 upward closes the eyelids 42, 44 to cover the model eyeball 20. FIG. 3 shows the eyelids 42, 44 in a closed position, covering a model contact lens 50.

Figure 5:
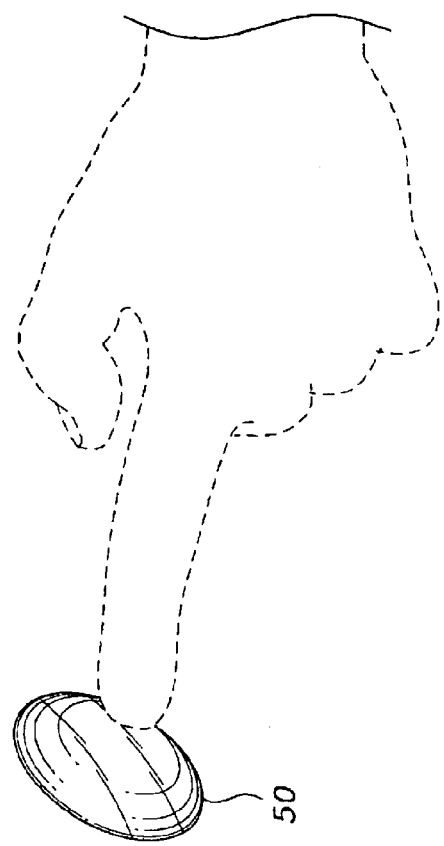
FIG. 5 is an environmental perspective view of a visual aid for using contact lenses according to the present invention, shown in use with the eyelids held open for placement of a contact lens.
Figure 5:
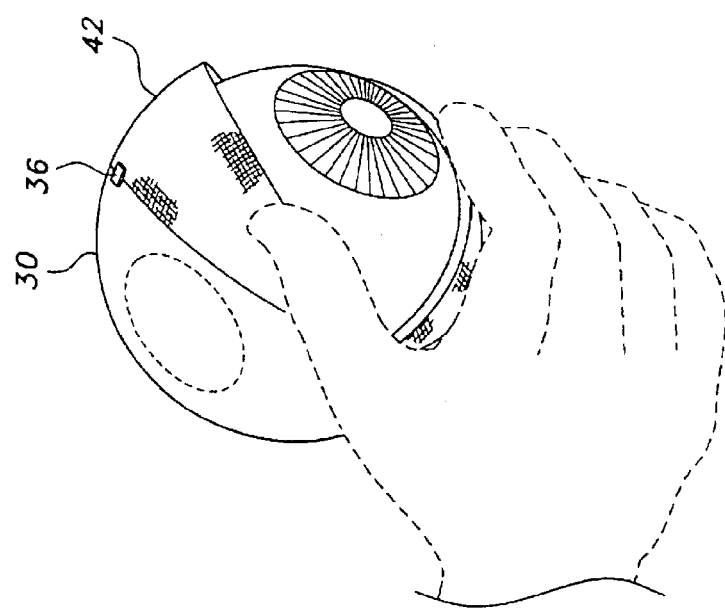

In use, the eyelids 42, 44 may be held opened or closed with the user's fingers. The user holds the eyelids 42, 44 open to place a model contact lens 50 onto the eyeball, covering the pupil and iris, as can be seen in FIG. 5.

The visual aid for using contact lenses 10 is a useful tool for demonstration of the proper techniques for using contact lenses. In practice, a new contact lens user is instructed in the use of the new contact lenses. This instruction typically includes proper hygiene, methods to insert and remove the lenses, and proper storage of the lenses. Proper hygiene includes washing the hands carefully and drying them completely. With clean hands, a contact lens is removed from its case and, typically while held in the palm of a hand, rinsed with a saline solution and then drained of the excess solution. The lens may then be placed in an eye. The steps of placing the lens in an eye may be demonstrated with the visual aid for using contact lenses 10. The visual aid for using contact lenses 10 is used to show the steps of pulling downward on the lower eyelid to form a cup, and placing a contact lens over the center of the eye covering the pupil and iris. A model contact lens 50 is placed over the pupil 22 and iris 24 of the model eyeball 20 to demonstrate these steps. The model eyeball 20 may be manipulated through the rear opening 34 to demonstrate an eye looking up or down to facilitate insertion of a lens. After the model contact lens 50 is placed on the model eyeball 20, the model eyeball 20 may again be manipulated through the rear opening 34 to demonstrate an eye moving thorough its entire range of motion to ensure proper fit of the contact lens and proper vision.

With the model contact lens 50 in place on the model eyeball 20, the visual aid for using contact lenses 10 may be used to demonstrate the removal of the contact lens. Techniques differ for removal of hard and soft contact lenses. The visual aid for using contact lenses 10 may be used to demonstrate both. Soft contact lenses are usually removed from the wearer's eye by simply pinching the lens and gently pulling it gently from the eye. To demonstrate the removal of a soft contact lens, the eyelids 42, 44 of the visual aid for using contact lenses 10 are held in a somewhat opened position as the model contact lens 50 is gently pinched and removed from the model eyeball 20. Hard contact lenses are typically removed from the wearer's eye by blinking in a manner so that the eyelids eject the lens from the eye. This is facilitated by using two fingers to gently pressure the lens prior to blinking, or by pulling an eyelid gently to one side while blinking. To demonstrate the first method of removing a hard contact lens, the model contact lens 50 disposed on the model eyeball 20 is gently pressured by two fingers and the eyelids 42, 44 are then closed in a blinking manner to eject the model contact lens 50. To demonstrate the second method of removing a hard contact lens, one of the eyelids 42, 44 is pulled gently to one side while the eyelids 42, 44 are closed in a blinking manner to eject the model contact lens 50.

It is to be understood that the present invention is not limited to the sole embodiments described above, but encompasses any and all embodiments within the scope of the following claims.

I claim:

1. A visual aid for using contact lenses comprising:
a cover having a front opening and a rear opening;
a model eyeball moveably contained within said cover, the model eyeball having visual indicia of a human eyeball;
an upper eyelid attached to said cover above the front opening; and
a lower eyelid attached to said cover below the front opening;
a plurality of clips disposed on said cover, said clips retaining said upper eyelid and said lower eyelid on said cover;
wherein said upper and lower eyelids are moveable between an open position and a closed position, and wherein said upper and lower eyelids in the open position define a visible surface of said eyeball.

2. The visual aid for using contact lenses of claim 1, wherein said model eyeball is generally spherical.

3. The visual aid for using contact lenses of claim 1, wherein said visual indicia of a human eyeball is visible on said visible surface when said eyelids are in the open position.

4. The visual aid for using contact lenses of claim 1, wherein said visual indicia of a human eyeball comprises visual indicia of a pupil.

5. The visual aid for using contact lenses of claim 4, wherein said visual indicia of a human eyeball further comprises visual indicia of an iris surrounding said pupil.

6. The visual aid for using contact lenses of claim 5, wherein said visual indicia of a human eyeball further comprises visual indicia of a sclera surrounding said iris.

7. The visual aid for using contact lenses of claim 1, further comprising a removable model contact lens removably disposed on the surface of said eyeball.

8. A method for using the visual aid of claim 1 for demonstrating a technique for inserting contact lenses, comprising the steps of:
(a) pulling the lower eyelid downward to form a cup;
(b) manipulating the model eyeball through the rear opening of the cover to simulate looking downward; and
(c) placing a model contact lens onto the model eyeball to cover the iris and pupil.

9. A method for using the visual aid of claim 1 for demonstrating a technique for removing a soft contact lenses, comprising the steps of:
(a) holding the upper and lower eyelids in an open position;
(b) pinching a model contact lens when the lens is disposed on the model eyeball; and
(c) pulling the model contact lens from the model eyeball.

10. A method for using the visual aid of claim 1 for demonstrating a technique for removing a hard contact lenses, comprising the steps of:
(a) using two fingers to gently pressure a model contact lens away from the model eyeball; and
(b) closing the eyelids in a blinking manner to cause the model contact lens to be ejected.

11. A method for using the visual aid of claim 1 for demonstrating a technique for removing a hard contact lenses, comprising the steps of:
(a) placing a finger on an outside corner of one of the upper and lower eyelids;
(b) pulling the eyelid gently to the side; and
(c) closing the upper and lower eyelids in a blinking manner to cause a model contact lens to be ejected.

* * * * *